(12) United States Patent
Marchand (10) Patent No.: US 6,427,922 B1
(45) Date of Patent: Aug. 6, 2002

(54) PRINTABLE MICROWAVE IMAGES FOR DATA ENCODING

(75) Inventor: J. F. Philippe Marchand, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/725,999

(22) Filed: Nov. 29, 2000

(51) Int. Cl.⁷ ................................................. G06K 7/10
(52) U.S. Cl. ................................ 235/494; 235/462.46
(58) Field of Search ........................ 235/494, 462.46

(56) References Cited

U.S. PATENT DOCUMENTS

| | | |
|---|---|---|
| 4,008,477 A | 2/1977 | Babij et al. |
| 5,581,257 A | 12/1996 | Greene et al. |
| 5,786,910 A | 7/1998 | Walters et al. |
| 5,979,758 A | 11/1999 | Swartz et al. |
| 5,986,550 A | 11/1999 | Rapaport et al. |
| 6,061,026 A | 5/2000 | Ochi et al. |

*Primary Examiner*—Harold I. Pitts
(74) *Attorney, Agent, or Firm*—Fay, Sharpe, Fagan, Minnich & McKee, LLP (57) ABSTRACT

A printable microwave image for data encoding is provided. The microwave image comprises a two-dimensional pattern of a plurality of pixels on a surface, wherein each pixel exists in one of two states with respect to radiation in a microwave frequency range. An opaque state prevents transmission of microwave radiation, and a transparent state permits transmission of microwave radiation. The applicable microwave frequency range is from a low frequency of 1 gigahertz to a high frequency of 200 gigahertz. The opaque pixels can be comprised of reflective printer ink that reflects the microwave radiation, absorbent printer ink that absorbs the microwave radiation, reflective laser printer toner that reflects the microwave radiation, absorbent laser printer toner that absorbs the microwave radiation, or a metal foil.

19 Claims, 8 Drawing Sheets

PRINTABLE MICROWAVE IMAGES FOR DATA ENCODING

BACKGROUND OF THE INVENTION

Barcodes are well known and frequently used symbols for identifying products, parts, prices, serial numbers, and many other bits of data. Over the years many different barcodes have been used, including the UPC codes found in grocery stores and the Code 39 barcodes used for many non-grocery items. However, basically the different barcodes are simply alternative ways of encoding information. For example, a narrow bar or space might represent a 0 while a wide bar or space might represent a 1, or a long bar might represent a 0 while a short bar might represent a 1.

Barcodes can differ on how they are sensed. Light, usually in the form of a scanning laser beam, or magnetic energy are commonly used to sense barcodes. A problem with light operated barcodes is that the barcode can become obscured, either with contaminates such as dirt or smudged ink, or by an opaque obstruction, such as a barcode-containing document being inside an envelope or under another document. Magnetic barcodes generally require careful, close placement of a magnetic barcode reader relative to the barcode itself. This can be very difficult to do.

Barcodes sensed by light cannot be placed where they cannot be scanned by a scanning light beam. For example, they cannot be placed on objects within envelopes, and they cannot be embedded beneath the surface of an object such as paper currency. While it might be possible to accomplish this objective with magnetic barcodes, it would be very difficult. The same objective can be accomplished with microwave barcodes using wires of various lengths to encode data, however, this method requires a microwave transmitter and receiver combination that scans multiple frequencies, one resonant frequency for each possible length of barcode wire.

Therefore, a new type of microwave image for data encoding, requiring only a single microwave frequency, would be beneficial. Even more beneficial would be a microwave image that is two dimensional, so that pictorials as well as data can be encoded, and is readable even when placed within opaque materials such as an envelope.

SUMMARY OF THE INVENTION

The present invention is directed to a printable microwave image for data encoding comprising a two-dimensional pattern of a plurality of pixels on a surface, wherein each pixel exists in one of two states with respect to radiation in a microwave frequency range. One state would be opaque, preventing transmission of the microwave radiation, and an alternate state would be transparent, permitting transmission of the microwave radiation. The microwave frequency range suitable for use with the present invention ranges from a low frequency of 1 gigahertz to a high frequency of 200 gigahertz. The two-dimensional microwave image is suitable for encoding pictorial images as well as encoding data. An improved detector for reading data encoded microwave images is also provided. The detector comprises two receiving elements connected in series with a diode, such as a Schottky. The total length of the receiving elements equals one half the wavelength of a microwave transmitter used to scan the images. A first quarter wavelength resonator lead has one end connected to one end of the Schottky diode, and the remaining resonator end serves as a first node to which a reader can be attached, wherein the quarter wavelength resonator is one half the length of the total length of the receiving elements. A second quarter wavelength resonator lead is equal in length to the first resonator lead with one end connected to the remaining end of the Schottky diode, and the remaining resonator end serves as a second node to which a reader can be attached.

It is an object of the present invention to provide a printable microwave image system that has the advantage of being insensitive to dirt and ink on the document to which the microwave image has been applied.

It is another object of the present invention to be able to read microwave images that have been placed on documents inside an opaque envelope.

It is still another object of the present invention to provide a microwave image that is two-dimensional and can encode images as well as data.

It is yet another object of the present invention to provide an improved microwave detector for reading microwave images that is smaller, simpler and more efficient than current microwave detectors.

The objects of the invention, along with the various features of novelty which characterize the invention, are pointed out with particularity in the claims attached to and forming a part of this disclosure. For a better understanding of the invention, its operating advantages and the specific objects obtained by its uses, reference should be made to the accompanying drawings and descriptive matter in which there is illustrated preferred embodiments of the invention.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

U.S. patent application Ser. No. 09/342,396, filed on Jun. 29, 1999, abandoned December, 2000, by Marchand, entitled Microwave Barcode, is hereby incorporated by reference. The application teaches the use of resonant conductive elements to encode data.

Figure 1:
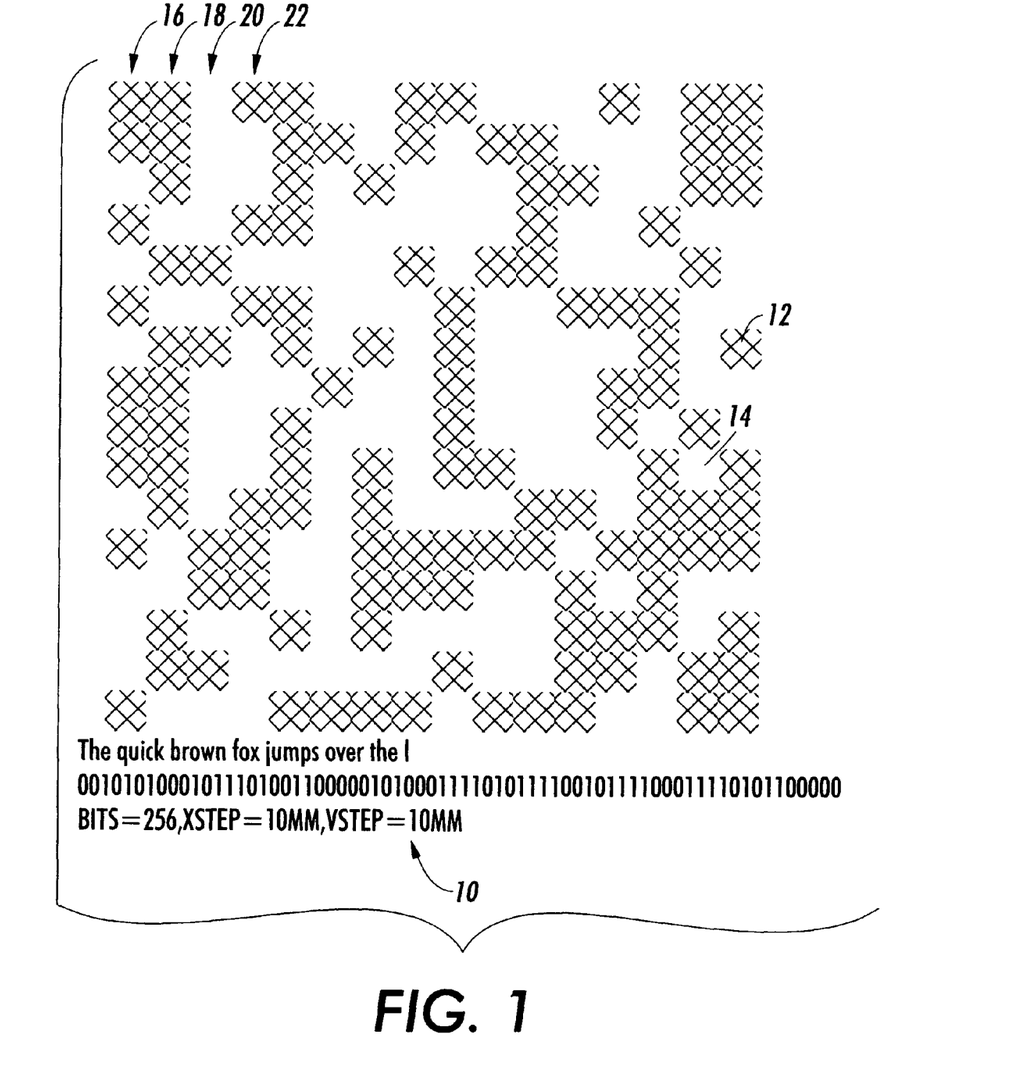
FIG. 1 illustrates an exemplary microwave image encoded with data.

FIG. 1 shows an exemplary embodiment of a printable microwave image 10 for data encoding. This particular embodiment is a data matrix comprised of a square sixteen by sixteen matrix of pixels in one of two states: pixels in the zero or "off" state, such as pixel twelve, are comprised of a metallic ink and appear as dark pixels in FIG. 1, and pixels in the one or "on" state, such as pixel fourteen, are the white squares that represent areas where no printing has taken place. This particular image is an encoding of the phrase "the quick brown fox jumps over the" and is represented in a seven bit binary ASCII format. In order to explain how the data was encoded for this image, Table 1 shows the ASCII coding for the first two words of the expression. Column 1 of Table 1 shows the alphabetic letter encoded. Column 2 shows the normal seven bit ASCII encoding for that letter, and in this particular image, the bits were recorded in a little-endian bit order, which is simply the normal ASCII code reversed, and the third column of Table 1 shows the bits in reversed order or little-endian bit order.

TABLE 1

| Letter | Normal ASCII | Little-endian ASCII |
|---|---|---|
| T | 1010100 | 0010101 |
| h | 1101000 | 0001011 |
| e | 1100101 | 1010011 |
| space | 0100000 | 0000010 |
| q | 1110001 | 1000111 |
| u | 1110101 | 1010111 |
| i | 1101001 | 1001011 |
| c | 1100011 | 1100011 |
| k | 1101011 | 1101011 |

The microwave image is scanned from top to bottom on the odd columns and from bottom to top on the even columns, starting with column 1. For example, starting at the top of first column 16 and scanning down, the first seven bits in sequence are 0010101, representing an upper case "T", followed by bit sequence 0001011 or the lower case "h." When the end of the first column 16 is reached, scanning continues at the bottom of second 18 column in an upward direction until the top of second column 18 is reached at which point scanning continues at the top of third column 20 in a downward direction and continuing again then at the bottom of fourth column 22 in an upward direction, and so forth. It is to be appreciated that the method of data coding in FIG. 1 is just one of any number of possible methods of encoding data that could be employed and is used in this case as an example for illustrative purposes only.

In this particular embodiment, pixels in the off state, such as pixel 12, are formed by a nonconductive metallic ink, however, a conductive metallic ink could be used as well. Pixels in the off state such as pixel 12, in this embodiment, are of such composition that they reflect the incident microwave radiation, however, they could just as well absorb the microwave radiation so long as they are opaque to the transmission of microwave radiation. It is also to be appreciated that the order of scanning and the size of the matrix are for exemplary purposes only and are not an important aspect of the present invention. In this particular example, the scanning was column-wise, alternately in a downward direction and then in an upward direction, and the matrix happened to be square in this example. However, any order of scanning in any size of matrix would be suitable for the purposes of the present invention.

Figure 2:
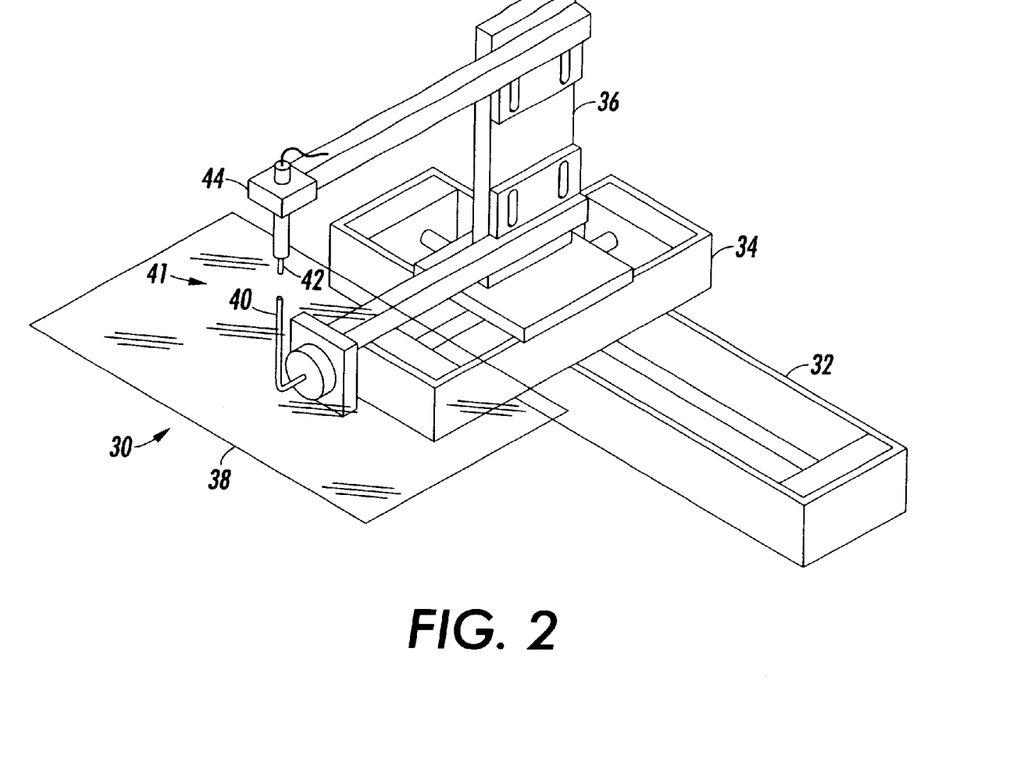
FIG. 2 shows an exemplary apparatus for scanning a microwave image.

An exemplary apparatus for scanning microwave image 10 is shown in FIG. 2. In FIG. 2, microwave imager 30 comprises a base 32, a saddle 34, a traveling column 36, a specimen support platform 38, a microwave transmitting antenna 40, and a microwave detector 41 comprising a microwave receiving antenna 42 and a detector diode 44. One possible scanning methodology for the microwave imager 30 would be to place microwave image 10 on platform 38 with columns of the image parallel to the saddle 34 in such a manner that the traveling column 36 can move antennas 40 and 42 along each column and the saddle 34 then can increment from column to column. As traveling column 36 alternately travels down the odd column numbers and up the even column numbers, saddle 34 traverses one column parallel to the rows immediately between each column scan.

Figure 3:
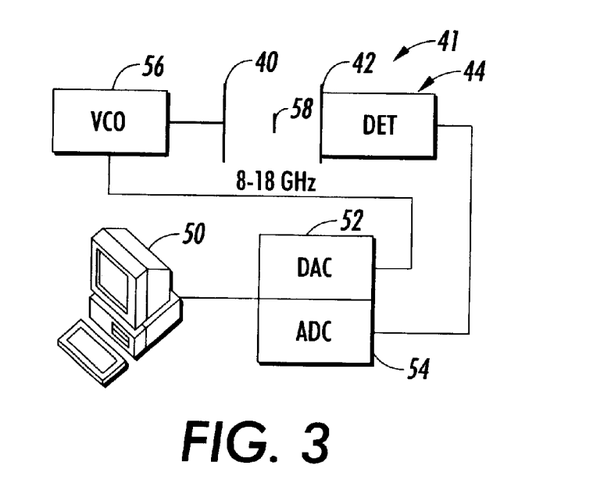
FIG. 3 shows a schematic of an exemplary test apparatus for a microwave imager.

Turning attention to FIG. 3 and with continuing reference to FIG. 2, a schematic of an exemplary test apparatus for a microwave imager is provided. Like numbered numerals in FIG. 3 represent like numbered elements in FIG. 2. The microwave imager 30 illustrated in FIG. 2 was also incorporated in the test system shown schematically in FIG. 3, however, major details of imager 30 were omitted from FIG. 3 for clarity. Only transmitting antenna 40 and microwave detector 41, comprising receiving antenna 42 and detector diode configuration 44, are shown in FIG. 3. A personal computer 50 is interfaced to both a digital analog converter 52 and an analog digital converter 54. The digital analog converter 52 is connected a to a voltage controlled oscillator 56 which in turn drives transmitting antenna 40 with microwave signals. Analog digital converter 54 is connected to detector diode configuration 44 which is in turn connected to receiving dipole antenna 42.

Figure 4:
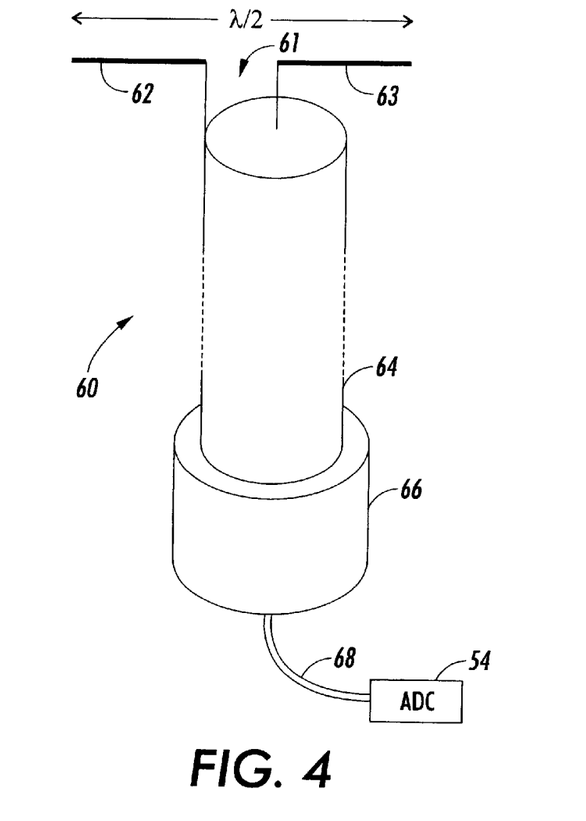
FIG. 4 shows a typical old method detector from prior art.

The specimen scanned in the exemplary test apparatus, microwave imager 30, was the microwave image 10 illustrated in FIG. 1 and is shown here as specimen 58. Specimen 58 was scanned at frequencies ranging between 8 and 18 gigahertz. Antenna 42 and detector 41 illustrated in FIG. 3 comprise one detector embodiment. Turning to FIG. 4, and with continuing reference to FIGS. 2 and 3, illustrated is a first embodiment of a detector 60. The detector 60 comprises a dipole antenna 61 with receiving elements 62 and 63. The total length of antenna 61 is one half of the microwave radiation wavelength. Antenna 61 is connected to a coaxial cable 64 which is in turn connected to a Schottky diode detector 66. The Schottky diode detector 66 in turn is connected by a pair of wires 68 to the analog digital converter 54.

Figure 5:
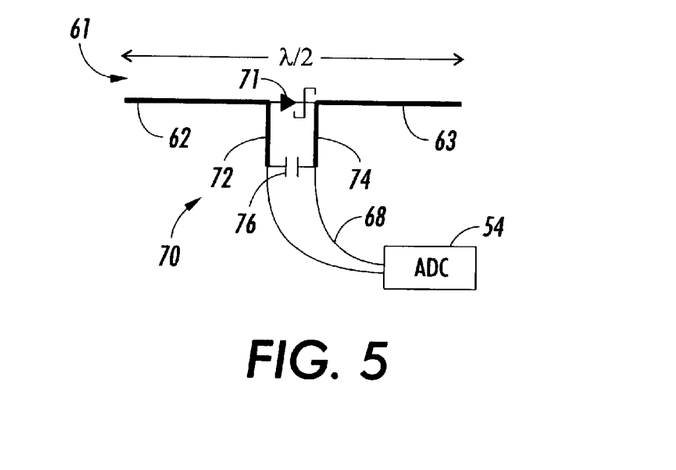
FIG. 5 shows a new method detector.

While detector 60 works satisfactorily, the fact that dipole antenna 61 is connected to the detector diode 66 though a length of coaxial cable contributes to signal loss and also makes for a bulky and extensive apparatus. A second embodiment of a detector configuration is illustrated in FIG. 5 by detector 70 where, again, like numbered numerals refer to like numbered elements. Detector 70 includes dipole antenna 61, comprising receiving elements 62 and 63. The total length of antenna 61 is, like above, one half the microwave radiation wavelength. However, a Schottky diode 71 is connected directly between and in series with receiving elements 62 and 63. The leads of Schottky diode 71 comprise part of the length of the receiving elements 62,63. A one-quarter wavelength resonator 72 is connected to one lead of Schottky diode detector 71 in a position perpendicular to receiving element 62. Another one-quarter wavelength resonator 74 is connected to the remaining lead of the Schottky diode detector in a position perpendicular to receiving element 63. A capacitor 76 is connected between the remaining ends of quarter wavelength resonators 72 and 74. The two leads of capacitor 76 are connected through a pair of wires 68 to the analog digital converter 54.

The arrangement illustrated in FIG. 5 comprises a very small and inexpensive detector. In fact, for the wavelengths used, between 8 and 18 gigahertz, the total length of receiving elements 62 and 63 is less than one centimeter. An advantage of detector 70 is that the detector is located at the receiving elements and there are no signal losses encountered in a coaxial cable before signal detection occurs. Of primary concern in microwave image scanner 30, as illustrated in FIG. 2, is the spatial resolution. The spatial resolution is limited mostly by the wavelength of the microwave radiation. For examples at 15 gigahertz, one half of the wavelength is approximately one centimeter, which is the length of the receiving elements 62,63 as shown in FIG. 3. A rule of thumb is that the minimum detectable feature size is about equal to the wavelength. To read an image with 30 spots per inch resolution thus requires sub-millimeter waves with a wavelength smaller than 1 millimeter. This corresponds to a frequency of at least 300 gigahertz. The desired resolution depends on the application and on the amount of information that must be stored.

Figure 6:
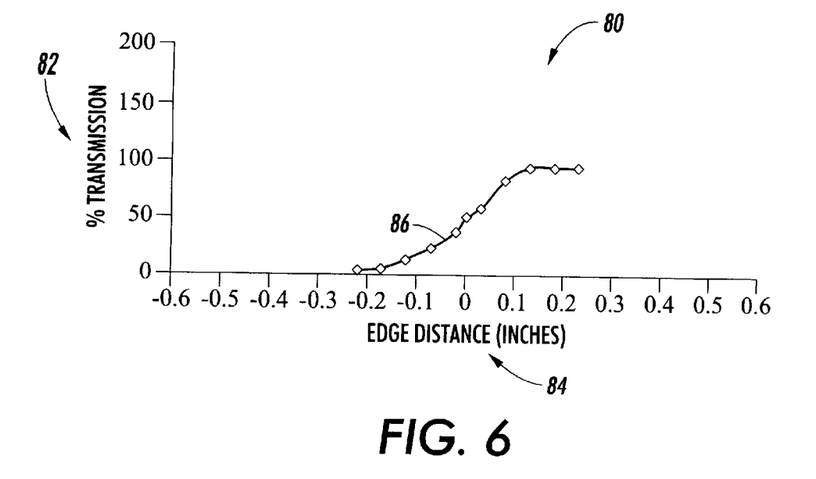
FIG. 6 shows results of a microwave imager spatial resolution test.

Another limiting factor in determining spatial resolution is the orientation of dipole antenna 61 with respect to the pixels and the direction of travel of the antenna in relation to the image. Optimal spatial resolution occurs when the receiving elements 62, 63 are parallel to the edge of a pixel that is being approached. Poorest spatial resolution occurs when the receiving elements 62, 63 are perpendicular to the edge of the pixel being approached. To determine the spatial resolution empirically, tests were performed with an 18 gigahertz microwave signal, with dipole antenna 61 approaching a known edge with the receiving elements 62,63 aligned perpendicular to the edge. The results of the spatial resolution test are illustrated in FIG. 6. Graph 80 shows percent of microwave transmission 82 versus distance from the pixel edge 84. The experimental data points are depicted as curve 86 with the points connected in a smooth curve. Curve 86 progresses from minimum transmission to maximum transmission over a distance of approximately 0.8 centimeters, and therefore microwave image 10, which is comprised of pixels one centimeter on a side, can be scanned since there is adequate spatial resolution for scanning that image. Images with pixels smaller than one centimeter in size, or even smaller than 0.8 centimeters in size, can also be scanned, however, the error rate would grow substantially as the pixel sizes are reduced. It can be observed in FIG. 1 that the phrase encoded microwave image 10 comprised 35 seven-bit characters or 245 discreet points, and the image was scanned with zero errors.

Figure 7:
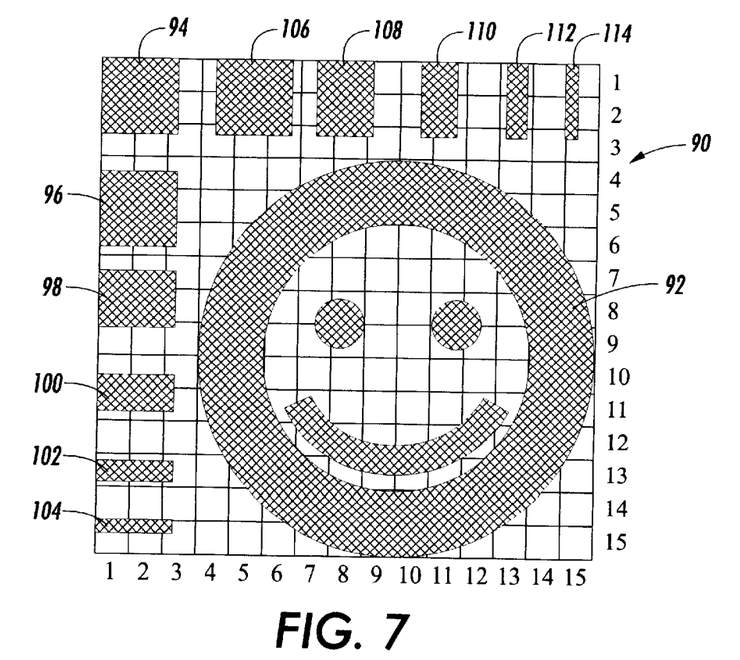
FIG. 7 shows a microwave image encoded with a smiling face and rectangles of various sizes.
Figure 8:
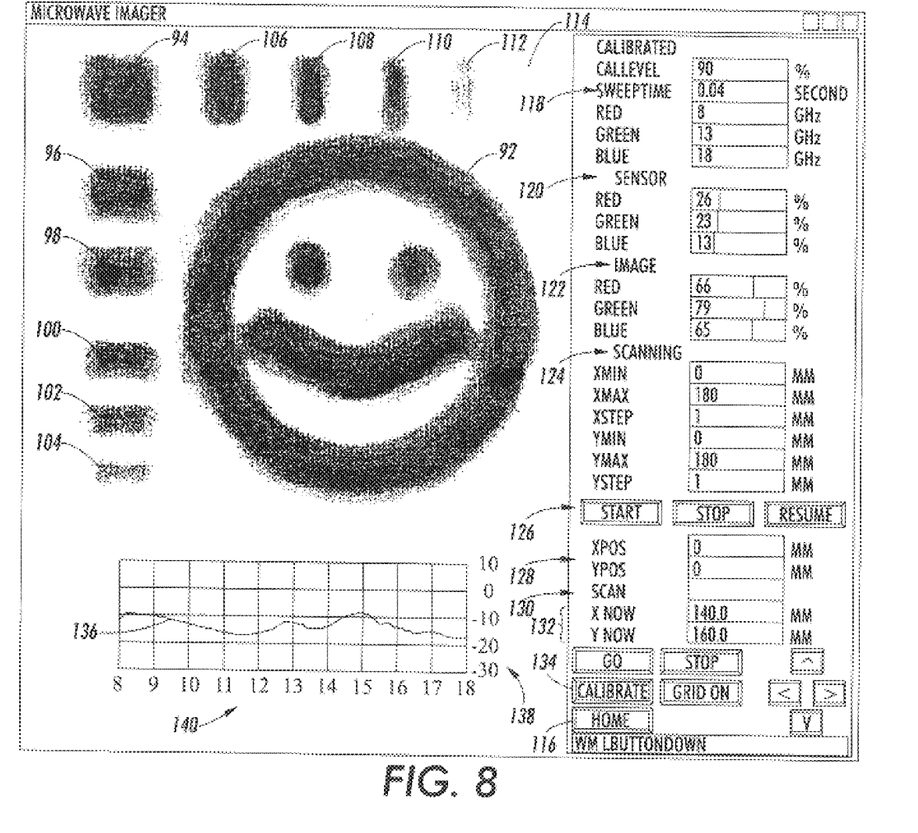
FIG. 8 shows the results of scanning the microwave image of FIG. 7 with the same apparatus used to scan the microwave image in FIG. 1.

While the microwave image scanned in FIG. 1, comprises a microwave image for data encoding, it is also possible to provide pictorial microwave images. FIG. 7 illustrates a microwave image 90 encoded with a pictorial image of a smiling face and rectangles of various sizes. With continuing reference to FIG. 7, FIG. 8 shows the results of scanning the microwave image 90 with the same apparatus used to scan microwave image 10 in FIG. 1. It can be seen that pictorial image 92 retains substantially the same recognizable character shape in FIG. 8 as shown in FIG. 7 in the original image.

Because scanned pictorial images can often be interpreted visually rather than digitally, as with a data encoded image such as shown in FIG. 1, errorless scanning of a pictorial image such as the smiling face in FIG. 7 is less critical than it is with a data encoded image. In such cases, the scanning steps can be reduced to sub-pixel size, smaller than the actual resolution of the detector, and the number of possible states can be increased to more than two to represent shades of gray. For example, with reference to FIG. 6, 0–12.5% transmission could represent black, 12.5–37.5% transmission dark gray, 37.5–62.5% medium gray, 62.5–87.5% transmission light gray, and 87.5–100% transmission could represent white. Of course the number of states can be arbitrarily large, for example 256 shades of gray or 256 colors. This technique would assist in interpreting images visually as will be apparent when FIGS. 9–14 are discussed.

Test rectangles are encoded in microwave image 90 to illustrate another problem with misalignment or miss-sizing the opaque rectangles in a data encoded image. Rectangles 94, 96, 98, 100, 102 and 104 were designed to be two columns wide but of varying thickness. Rectangle 94 fills a little more than two rows in thickness and then the rectangles become progressively smaller until rectangle 104 is less than half a pixel in height. Conversely, rectangles 106, 108, 110, 112 and 114 were designed to be more than two rows in thickness, however, on the axis parallel to the columns, they are progressively smaller in size starting from rectangle 94 and going to the right to rectangles 106, 108, 110 and 112 until rectangle 114 is less than half a pixel in width. This image was scanned in the same order as microwave image 10 in FIG. 1 with the dipole antennae aligned parallel to the columns.

The results shown in FIG. 8 illustrate how spatial resolution might be affected by miss-sizing and misalignment. Rectangles 94, 96, 98, 100, 102 and 104 were recognized since the dipole antenna was able to detect the edges of these rectangles and does then traverse those edges. However, we can see in the worst case with rectangle 104, the end result appears to be larger in thickness in a direction parallel to the column although the intensity is reduced. The end result is, however, lightly shaded because of the sub-pixel size of rectangle 104 in vertical dimension, resulting in an intermediate % transmission of the microwave radiation. Looking at rectangles 106 through 114 it can be seen that the rectangles were detected until, but not including, rectangle 114. With the dipole antenna being aligned parallel to the columns, the dipole antenna never traversed rectangle 114 and therefore rectangle 114 was not imaged in FIG. 8 representing where rectangle 114 should be but is, in fact, missing. Pictorial image 90, encoded in FIG. 7, was encoded with the same metallic ink used to encode the exemplary microwave image for data encoding in FIG. 1.

FIG. 8 also depicts an informational block 116 setting forth various criteria of the image-scanning process being undertaken. This information includes a first block of data 118 including the calibration level of the system, the sweep time, which represents a time period for a one-scan step to be completed, and the wavelengths associated with particular display colors for sensing (i.e. red is 8 GHz, green is 13 GHz, and blue is 18 GHz). The next block of sensor data informs a user as to what percentage of an image is red, green or blue as recorded by the sensor unit. The image block 122 sets out the percentage a particular color will have in the image (i.e. red, green or blue). Scanning block 124 will display a minimum scanning in the x direction (x min) and a maximum scanning distance (x max) in a particular sized step (x step). Similar information is provided for movement in the y direction (y min, y max, y step). Buttons 126 are provided to start, stop and resume the scanning operation. An x and y beginning position blocks 128 (x pos, y pos) informs a user as to the beginning position of a scanner in a calibrated matrix. A scan block 130 informs a user as to which scan procedure on the image is being undertaken (i.e. 0, 1, 2, etc.). A present scan position blocks 132 inform a user as to a present position in the y and x axis (x now, y now). Further operational buttons 134 include a start, go button, a stop button, a calibration button, a grid-on button (which sets forth a grid backdrop for the image), and a home button. A calibration graph 136 is provided to show the attenuation of microwave transmission 138 versus sensing frequency, in gigahertz, 140.

Figure 9:
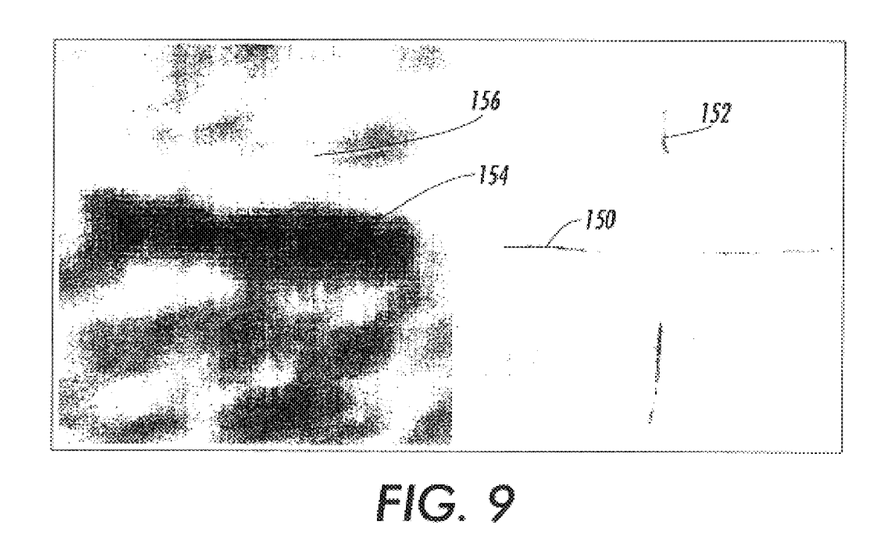
FIG. 9 shows the results of scanning a pair of wires at right angles to each other.

The problem with spatial resolution demonstrated by rectangle 114 in FIG. 8 is further illustrated in FIG. 9 where the results of scanning a pair of wires at right angles to each other is shown. The microwave radiation from a dipole antennae of the present invention is polarized. The polarized microwave in this case only sees horizontal wires. Wires 150 and 152 represent a visible light image of the wires. The corresponding microwave image is represented by numerals 154 and 156 where it can be observed that vertical wire 142 is not visible in the microwave image due to the polarized nature of microwave radiation.

The microwave images described in this application do not depend on the resonance at any particular frequency but are similar to regular "visible" images in the way they are used. The main difference being that "microwave light" is used to view the images, rather than visible light.

Figure 10:
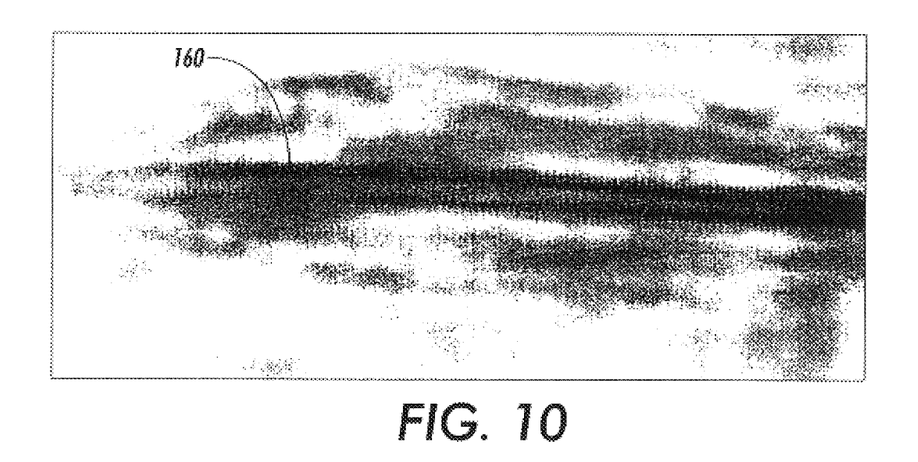
FIG. 10 shows a microwave image scan of a leaf.
Figure 11:
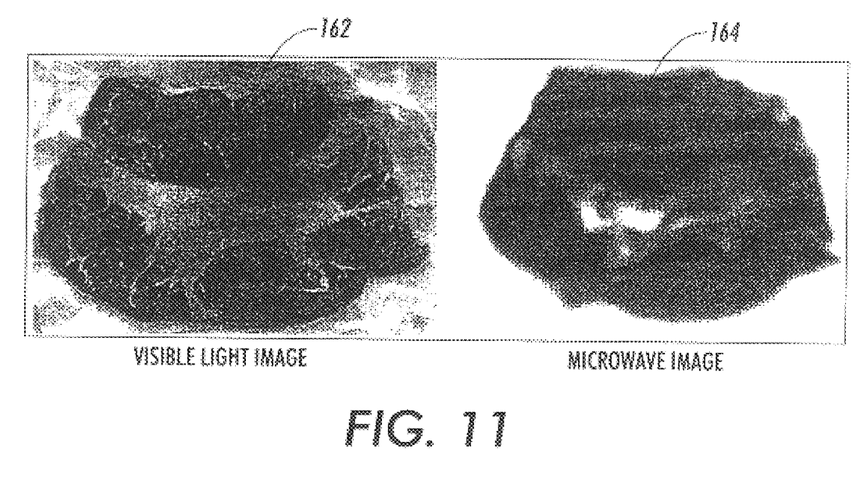
FIG. 11 shows a visible light scan of a typical cut of steak from a grocer.

Another aspect of the present invention is its ability to provide internal views of living organisms. In FIG. 10, a microwave image scan 160 of a leaf is shown. The leaf being scanned is comprised mostly of water which absorbs some microwave radiation much like a microwave oven absorbs radiation due to resonance of the water molecules within the microwave signal. FIG. 11 shows a visible light scan of a typical cut of steak 162 from a grocer and the resulting microwave image 164. It can be readily observed by comparing the two images that the microwave image scan differentiates between the fat and the meat and could be used as a means of determining digitally the fat content of meat.

Figure 12:
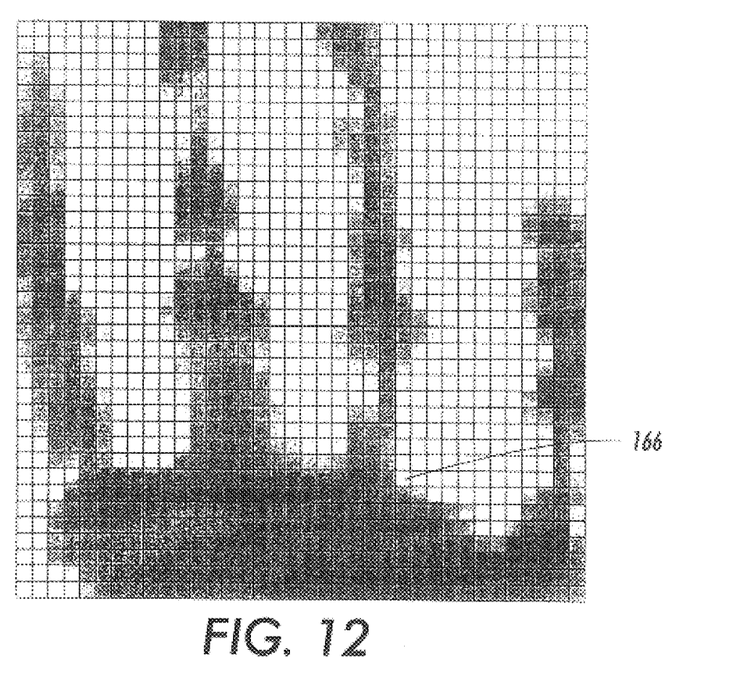
FIG. 12 a microwave image from scanning a human hand.

Another scan is presented in FIG. 12 where a human hand was scanned and a microwave image of that human's hand is shown by numeral 166. It can be seen that the resolution in the 8 to 18 gigahertz range is insufficient to show clear detail of the hand.

Figure 13:
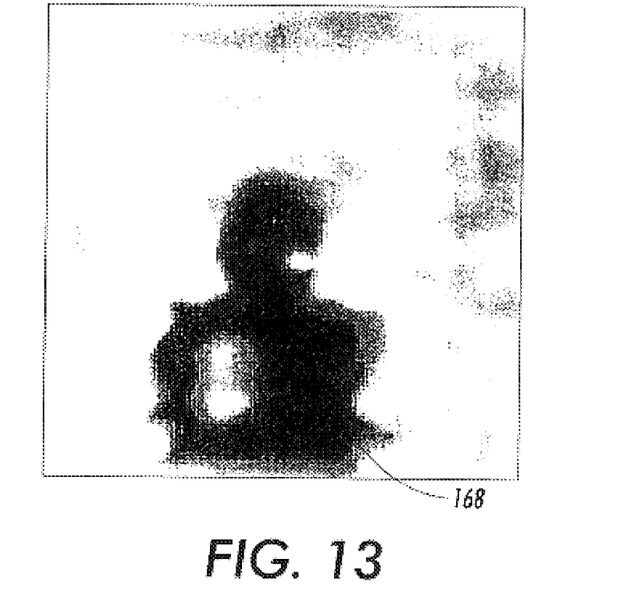
FIG. 13 shows a microwave image scan of a floppy disk.

FIG. 13 shows a scan of a floppy disk where metal portions of the floppy disk are easily recognized in microwave image 168.

Figure 14:
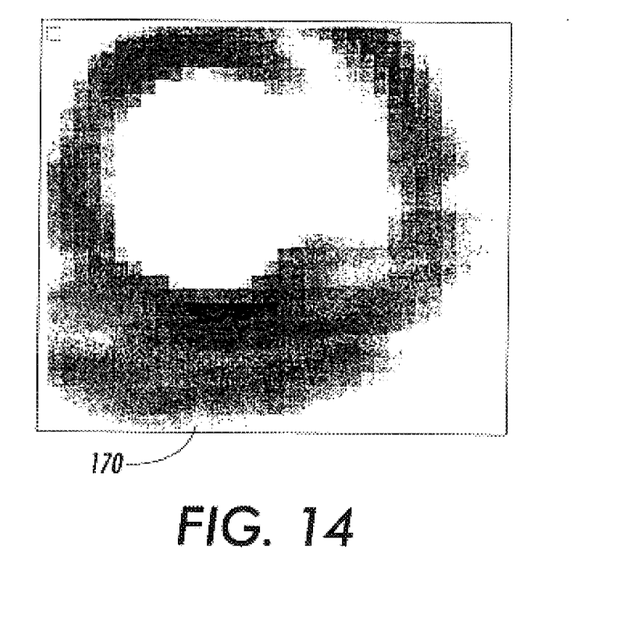
FIG. 14 shows a microwave image scan of a stone.

FIG. 14 demonstrates another characteristic of imaging by use of microwave radiation, as it passes through a stone. A stone is transparent to microwave radiation but, much like a glass lens with visible light, it refracts the radiation as it passes through the stone, and the microwave image 170 clearly shows the effects of that refraction where the stone is acting very much like a lens.

Numerous applications for microwave images can exist. A typical application is in connection with document integrity. For example, when printing personal statements for a large insurance company, each statement is unique. After printing, each statement will be inserted in an envelope for mailing. For quality control it is very important to be able to verify that all statements are in the envelopes. This can be achieved by incorporating a microwave image in each statement. The completed mailing can then be scanned and the contents of the envelopes can be verified.

Another application is with labels that are glued to products or packages where the label can be printed with the microwave image on the reverse side. In this case, the microwave image is invisible to the customer, takes up no space and is protected from damage. The microwave image can, for example, be used for automatic routing, etc.

In some cases, it is desirable to hide the microwave image from the customer. There are several ways in addition to printing on the reverse side of a label that this can be accomplished. For example, a microwave detectable optically invisible ink can be used. Therefore, with if the microwave ink is optically transparent, or is of the same color as the paper, then the image will not be visible.

Another method of hiding a microwave image from the customer would be overprinting the microwave image with another visible image. A visible pattern can be used to hide or obscure the microwave image. In addition to the images described, microwave barcode and glyph images can also be formed.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, I hereby claim:

1. A printable microwave image for data encoding comprising:
   a two-dimensional pattern of a plurality of pixels on a surface, wherein each pixel is detectable within a microwave frequency range as being one of at least two or more states with respect to microwave transmission:
   a first state being opaque, preventing transmission of the microwave radiation; and,
   a second state being transparent, permitting transmission of the microwave radiation.

2. The printable microwave image for data encoding of claim 1, wherein each of said pixels is further divided into sub-pixels for scanning purposes and detectable within a microwave frequency range as being one of more than two states with respect to microwave transmission, wherein each detected sub-pixel is displayed as one of:
   a shade of gray unique to an approximate percentage of microwave transmission; and,
   a color unique to an approximate percentage of microwave transmission.

3. The printable microwave image for data encoding of claim 1, wherein said microwave frequency range is from a low frequency of 1 gigahertz to a high frequency of 200 gigahertz.

4. The printable microwave image for data encoding of claim 1, wherein each opaque pixel comprises one of:
   reflective printer ink that reflects the microwave radiation; and,
   absorbent printer ink that absorbs the microwave radiation.

5. The printable microwave image for data encoding of claim 1, wherein each opaque pixel comprises one of:
   reflective laser printer toner that reflects the microwave radiation; and,
   absorbent laser printer toner that absorbs the microwave radiation.

6. The printable microwave image for data encoding of claim 1, wherein each opaque pixel comprises a metal foil.

7. The printable microwave image for data encoding of claim 1, wherein each opaque pixel comprises one of:
   a nonconducting coating that reflects the microwave radiation; and,
   a nonconducting coating that absorbs the microwave radiation.

8. The printable microwave image for data encoding of claim 1, wherein the microwave image comprises a two-dimensional data matrix.

9. The printable microwave image for data encoding of claim 1, wherein the microwave image comprises a two-dimensional pictorial image.

10. A method for encoding data with a printable microwave image comprising:

printing a two-dimensional pattern of a plurality of pixels on a surface, wherein each pixel is detectable within a microwave frequency range as being one of at least two or more states with respect to microwave transmission:

a first state being opaque, preventing transmission of the microwave radiation; and,         a second state being transparent, permitting transmission of the microwave radiation.

11. The printable microwave image for data encoding of claim 10, wherein each of said pixels is further divided into sub-pixels for scanning purposes and detectable within a microwave frequency range as being one of more than two states with respect to microwave transmission, wherein each detected sub-pixel is displayed as one of:

a shade of gray unique to an approximate percentage of microwave transmission; and,     a color unique to an approximate percentage of microwave transmission.

12. The method of encoding data of claim 10, wherein each opaque pixel comprises one of:

a nonconducting printer ink that reflects the microwave radiation; and,     a nonconducting printer ink that absorbs the microwave radiation.

13. The method of encoding data of claim 10, wherein each opaque pixel comprises one of:

a conducting printer ink that reflects the microwave radiation; and,     a conducting printer ink that absorbs the microwave radiation.

14. The method of encoding data of claim 10, wherein each opaque pixel comprises one of:

a nonconducting laser printer toner that reflects the microwave radiation; and,     a nonconducting laser printer toner that absorbs the microwave radiation.

15. The method of encoding data of claim 10, wherein each opaque pixel comprises one of:

a conducting laser printer toner that reflects the microwave radiation; and,     a conducting laser printer toner that absorbs the microwave radiation.

16. The method of encoding data of claim 10, wherein the microwave image comprises a two-dimensional data matrix.

17. The method of encoding data of claim 10, wherein the microwave image comprises a two-dimensional pictorial image.

18. The microwave image according to claim 1 wherein the two dimensional image is substantially undetectable by an unaided human viewing.

19. The method according to claim 10 wherein the printing step includes printing the two-dimensional pattern to be substantially undetectable by an unaided human viewing.

\* \* \* \* \*